United States Patent
Herman

(10) Patent No.: US 7,913,881 B2
(45) Date of Patent: Mar. 29, 2011

(54) VISCOUS MATERIAL DISPENSER PISTON

(75) Inventor: Timm Herman, Ellicottville, NY (US)

(73) Assignee: Meritool LLC, Ellicottville, NY (US)

( * ) Notice: Subject to any disclaimer, the term of this patent is extended or adjusted under 35 U.S.C. 154(b) by 1291 days.

(21) Appl. No.: 10/578,079

(22) PCT Filed: Nov. 12, 2004

(86) PCT No.: PCT/US2004/037939
§ 371 (c)(1),
(2), (4) Date: May 3, 2006

(87) PCT Pub. No.: WO2005/050068
PCT Pub. Date: Jun. 2, 2005

(65) Prior Publication Data
US 2007/0068973 A1    Mar. 29, 2007

Related U.S. Application Data

(60) Provisional application No. 60/519,711, filed on Nov. 13, 2003.

(51) Int. Cl.
*B67D 7/60* (2010.01)
(52) U.S. Cl. ....... 222/386.5; 222/386; 92/204; 604/219; 277/434; 277/436
(58) Field of Classification Search ................ 222/386, 222/386.5; 92/193, 194, 240, 241, 245, 207, 92/206, 204; 277/434–437, 467, 468, 555, 277/452, 439; 604/218–231
See application file for complete search history.

(56) References Cited

U.S. PATENT DOCUMENTS

| 772,457 | A | * | 10/1904 | Cramer | 92/194 |
| 1,097,563 | A | * | 5/1914 | Sowden | 92/240 |
| 1,324,272 | A | | 9/1919 | Ryan | |
| 1,386,333 | A | * | 8/1921 | Hill | 92/240 |
| 1,521,890 | A | | 1/1925 | Klein | |
| 1,769,984 | A | * | 7/1930 | Bockius | 92/241 |
| 1,796,415 | A | * | 3/1931 | Tyler | 92/194 |
| 1,849,096 | A | * | 3/1932 | Kibele | 92/184 |
| 1,894,771 | A | * | 1/1933 | Karasinski | 92/194 |
| 2,163,162 | A | * | 6/1939 | Wells | 92/251 |
| 2,188,106 | A | * | 1/1940 | Caldwell | 92/175 |
| 2,198,129 | A | | 4/1940 | Sanford et al. | |
| 2,246,685 | A | * | 6/1941 | Johansen | 92/194 |
| 2,630,006 | A | * | 3/1953 | Leach | 401/179 |

(Continued)

FOREIGN PATENT DOCUMENTS
DE    18 77 413 U    8/1963

*Primary Examiner* — Kenneth Bomberg
*Assistant Examiner* — Robert K Nichols, II
(74) *Attorney, Agent, or Firm* — Tarolli, Sundheim, Covell & Tummino LLP

(57) ABSTRACT

A piston assembly for use in a viscous material dispenser is disclosed. The assembly has a main body with an axial bore for receipt of a push rod. The body has a face including an annular recess and an endless lip surrounding the recess. A camming washer is disposed at least in part in the recess. The washer includes a perimeteral camming surface engageable with the lip. The body and washer are connected together for limited relative axial movement when the piston assembly is advanced against material in a cartridge to dispense such material. The relative movement is effective to cause the camming surface to force the lip outwardly into tight engagement with a wall of such a cartridge.

20 Claims, 3 Drawing Sheets

U.S. PATENT DOCUMENTS

| | | | |
|---|---|---|---|
| 2,701,172 A * | 2/1955 | Koester | 92/194 |
| 2,702,220 A * | 2/1955 | Johnson | 92/194 |
| 2,757,993 A * | 8/1956 | Flick | 92/184 |
| 2,814,540 A * | 11/1957 | Southerwick | 92/194 |
| 3,092,427 A * | 6/1963 | Sadler et al. | 92/194 |
| 3,102,455 A * | 9/1963 | Breitenstein | 92/155 |
| 3,143,934 A * | 8/1964 | Nelson | 92/250 |
| 3,537,621 A | 11/1970 | Walter | |
| 4,741,462 A | 5/1988 | Schneider, Jr. | |
| 5,323,931 A * | 6/1994 | Robards et al. | 222/96 |
| 5,775,539 A | 7/1998 | Bates et al. | |
| 5,873,970 A | 2/1999 | Konuma et al. | |
| 5,909,830 A | 6/1999 | Bates et al. | |
| 5,941,162 A * | 8/1999 | Kiesel | 92/245 |
| 2003/0010202 A1 * | 1/2003 | Norheim | 92/245 |

\* cited by examiner

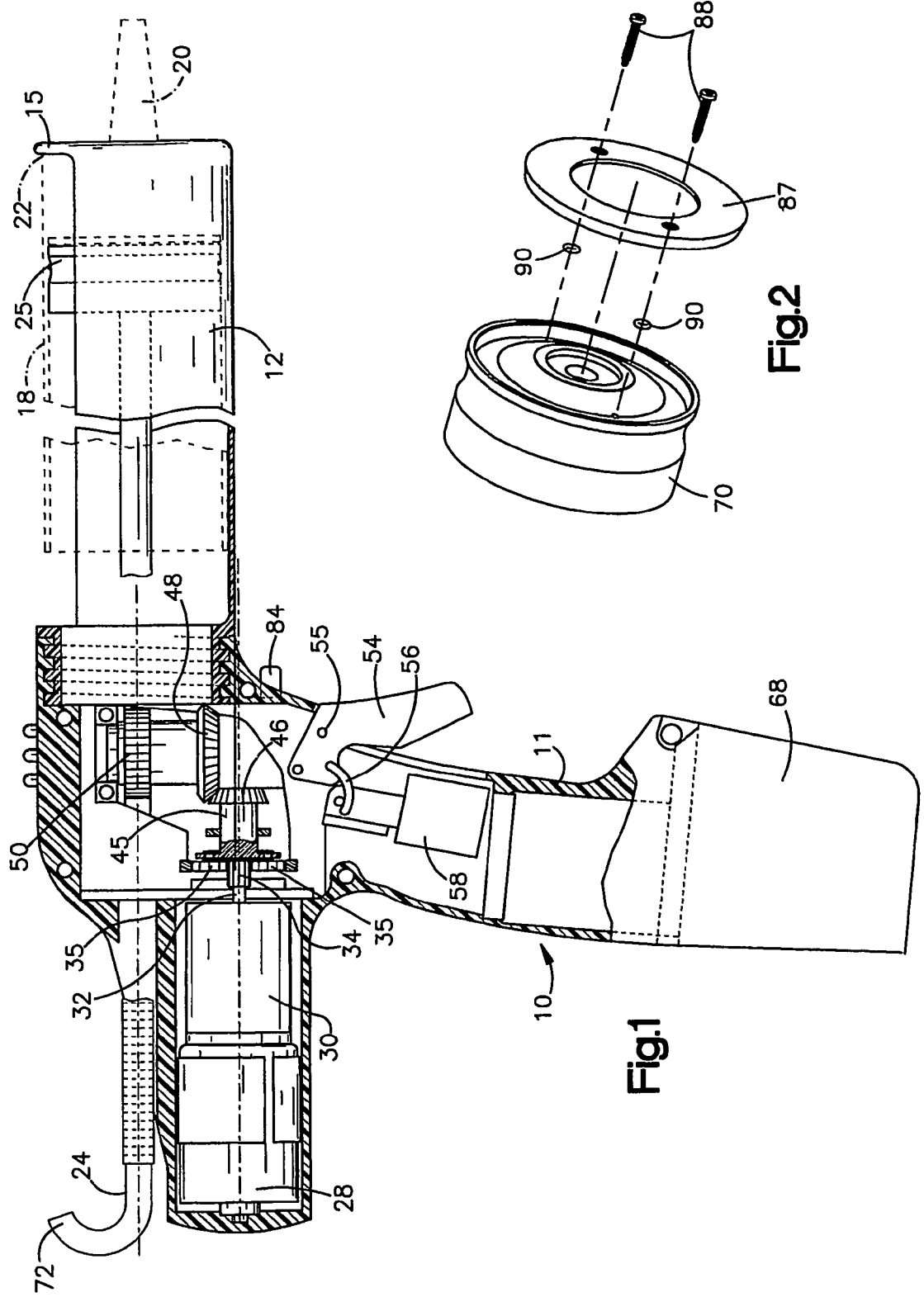

VISCOUS MATERIAL DISPENSER PISTON

CROSS REFERENCE TO RELATED APPLICATIONS

The present application claims priority to International Application Number PCT/US2004/037939 having an international filing date of Nov. 12, 2004 which claims priority to U.S. Provisional Application Ser. No. 60/519,711 having a filing date of Nov. 13, 2003. This application claims priority to and incorporates by reference all the aforementioned applications in their entirety for all purposes.

FIELD OF THE DISCLOSURE

This invention relates to viscous dispensers and more particularly to a piston for use with a dispenser of highly viscosity viscous materials.

BACKGROUND

Viscous material dispensers, some of which are known as caulking guns, are now well known. A dispenser described and claimed in U.S. Pat. Nos. 5,775,539 and 5,909,830 issued Jul. 7, 1998 and Jun. 8, 1999 (herein The Patents) is a high pressure dispenser that has enjoyed commercial success. The dispenser's success has been in mixing and dispensing two part materials of high viscosity. An example of such a material is that material which is used in installing replacement windshields and rear windows in automobiles.

The Patents disclose and claim a piston which when made into high precision prototypes preformed quite well when dispensing materials in tests. However, pistons of the type disclosed in The Patents when produced in quantities did not prove fully satisfactory when used with one commercially available two part adhesive having one of its to be mixed parts housed in an aluminum alloy foil "sausage" skin. When the piston of The Patents, is used with this particular two part material the sausage skin all too frequently bypasses the flexible lip of a piston and extends between the piston and a surrounding, close fitting, wall of the dispenser

SUMMARY OF THE DISCLOSURE

A piston of an organic material is provided. The piston has a material engaging face surface at its front with a cylindrical forward projection surrounded by an annular recess. A piston lip surrounds the recess. The lip flares outwardly as it extends forwardly from the face surface. An annular expansion plate or camming washer is positioned in the recess and located in axial alignment with the piston by the forward projection.

The plate has a perimeter surface which tapers outwardly from the front to back. When dispensing force is applied to the back of the piston and the plate, the tapered surface forces the piston lip outwardly into tight sliding contact with a cylindrical internal wall of a dispenser. The higher the viscosity of the material being dispensed the greater the force used to dispense the material and as a result a greater outward force is applied to the piston lip assuring that the sausage skin will not pass between the lip and the internal wall.

BRIEF DESCRIPTION OF THE DRAWINGS

FIG. 1 is a side elevational view of a battery operated viscous material dispenser with parts broken away and removed, the dispenser being equipped with the piston assembly of the present disclosure;

FIG. 2 is an exploded view of the piston assembly;

DETAILED DESCRIPTION

Figure 3:
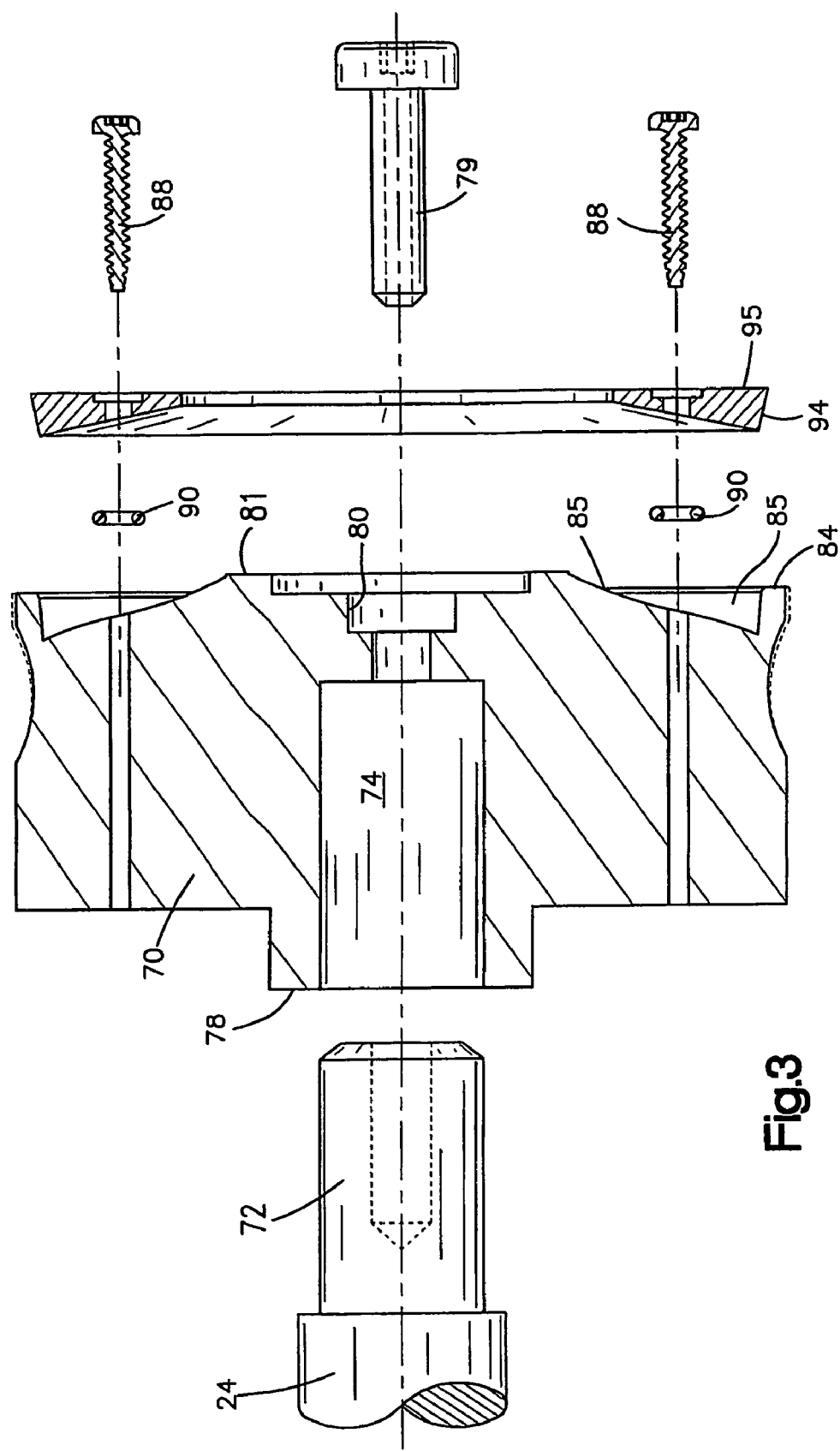
FIG. 3 is an exploded cross sectional view on an enlarged scale of the piston assembly; and, FIG. 4 is a cross sectional view of the piston assembly on the scale of FIG. 3.

FIG. 1 is a replication the viscous dispenser 10 of FIG. 1 of The Patents modified to show the piston assembly of the present disclosure at P. The dispenser includes a handle section 11 and a cartridge support section 12. The support section includes an end wall 15 having a nozzle receiving slot, no shown. A cartridge containing material to be dispensed is shown in phantom at 18. The cartridge includes a dispensing nozzle 20 which extends through the slot while an end of the cartridge 22 abuts the end wall 15.

An elongate rod 24 extends axially into the support section 12. The piston P is connected to a forward end of the rod such that axially movement of the rod will cause comparable axial movement of the piston. An electric motor 28 is mounted in a rearward portion of the handle 11. The motor is connected to gearing within a gear box 30. The gear box has an output shaft 32 The shaft drives a gear train 34, 35, 45, 46, 48 as described more fully in the patents. The gear train drives a pinion 50 which in turn drives a rack 52 formed on the rod 24.

A trigger 54 is connected to the handle section 11 by a pivot 55. An arm 56 of the trigger coacts with a control arm 57 of a speed control switch 58. The speed control switch is electrically connected to a battery 68. Operation of the motor 58 to advance the rod 24 is described more fully in The Patents.

The Piston P

The piston P includes a main plastic body 70 which is preferably made of nylon. The body is unitary and of circular cross section. The rod has a reduced diameter end portion 72 which is disposed in a rearward large diameter section of a through bore 74 of the main body 70. The rod has a shoulder 76 which abuts a rear wall section 78 of the body 70. A bolt 79 is disposed in the through bore and threaded into the rod end portion. A head of the bolt 79 is disposed in a counterbore 80 in a face surface 81 of the main body. The bolt head abuts a shoulder 82 at the base of the counterbore 80 to fix the main body 70 and the rod 24 together.

The main body 70 includes a perimeteral lip 84 which when in use closely engages a cylindrical inner surface of a material cartridge 18. The remainder of the perimeteral surface of the body rearward of the lip is cylindrical. The lip 84 surrounds a recess 85 in the face 81 of the body 70. The recess flares outwardly and rearwardly from an annular central or nose section 86 having a surface normal to the axis of the piston. The recess has its greatest depth from the plane of the central section surface adjacent the lip 84. An annular disc or camming washer 87 is disposed in the recess 85. The washer has an outwardly tapering thickness such that it is at its thickest at its perimeter and it nests nicely in the flaring recess 85.

Figure 4:
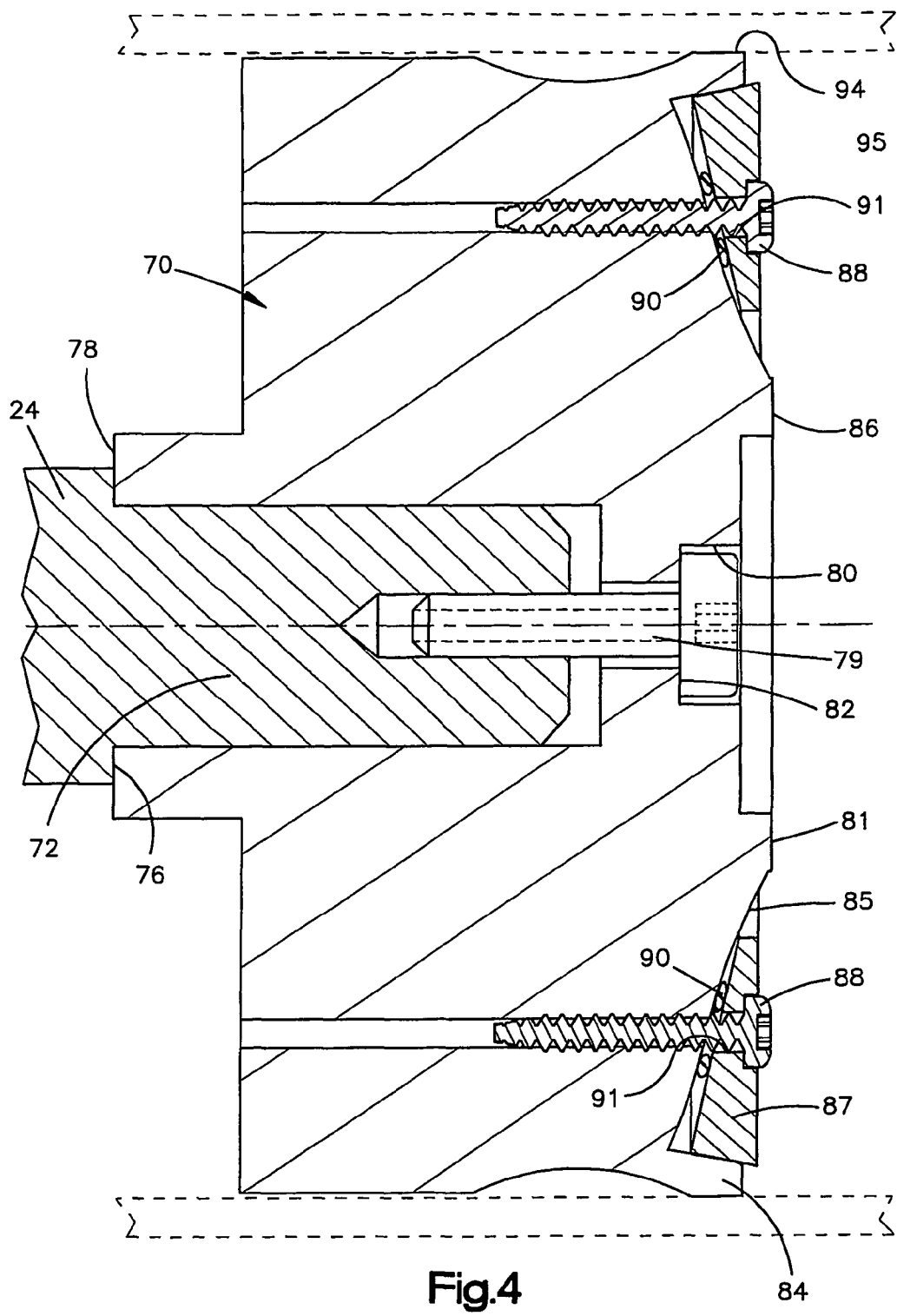

The washer may be made of metal such as an aluminum alloy but the currently preferred material is a polymer sold under the trademark Delrin. The camming washer is secured to the main body 70 by a pair of screws 88. As is best seen in FIG. 4, the screws extend through small apertures 91 in the camming washer and a small compressible O rings 90. The screws 88 are threaded into the main body 70 to secure the camming washer in place with the O rings trapped between the washer and the main body.

As is best seen in FIGS. 3 and 4, the camming washer has a tapering perimeteral camming surface 94. The surface 94 tapers from its largest diameter adjacent a face 95 of the washer to its smallest diameter in the recess 85. The camming surface 94 engages and coacts with the perimeteral lip 84.

Operation

In operation the rod 24 is retracted and a cartridge is inserted into the cartridge support section 12. The rod is then advanced until the piston has entered the cartridge and the camming washer engages a "sausage" containing the material to be dispensed. As the piston is further advanced by operation of the motor 28. As motor operation continues to advance the piston against the resistance of the material being dispensed, the camming washer is pressed further into the recess 85. Thus, there is relative axial movement between the washer 87 and the main body 70. This relative movement compresses the O rings 90 and causes the camming surface 94 to act against the lip 84. The action of the camming surface forces the lip outwardly into a tight wiping relationship with walls of the cartridge from which material is being dispensed. The outward deformation of the lip is graphically illustrated by the phantom lines of FIG. 3.

Tests have shown the piston assembly described and shown here to be highly effective when used with any present day cartridge. In all such tests the "sausage skin" of every cartridge tested was cleanly maintained on the material side of the piston and the skin did not find its way between the perimeter of the piston and the inner wall of a cartridge from which material was dispensed.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

I claim:

1. For use in a viscous material dispenser, a piston comprising
    a. unitary body of circular cross section including:
        i. a spaced face and back surfaces;
        ii. an axial bore extending between the surfaces;
        iii. a face surface including a nose section surrounding said bore and an annular recess section surrounding the nose section, the recess section being perimetrically surrounded by a lip;
        iv. a perimetral surface extending axially from the face to the back surface; and
        v. the perimetral and face surfaces together defining a perimetral lip around a concave section, the lip being of tapering thickness tapering from its thickest part at a location nearest the back surface forwardly to a thin termination at a juncture of the face and the perimetral surfaces;
    b. an annular disc positioned in the annular recess section;
    c. the disc including a peripheral surface coactable with the lip to transmit comprising forces against the lip and thence against a surrounding wall of a cylinder where the piston is in use; and
    d. at least one elastic member positioned within said annular recess section between said body and said annular disc, the elastic member forming a gap radially inward and radially outward from the elastic member between the body and annular disc such that compression of the elastic member causes the peripheral surface to act against said lip.

2. The pistons of claim 1 wherein the lip flares outwardly as it intends in a forward direction relative to the force and back surfaces.

3. The piston of claim 1, wherein said annular disc includes an outwardly tapering thickness such that said disc is thickest at its perimeter.

4. The piston of claim 1, wherein said annular disc is made from a metal.

5. The piston of claim 1, wherein said annular disc is made from a polymer.

6. For use in a viscous material dispenser, a piston comprising a unitary body of circular cross section including:
    a. a spaced face and back surfaces;
    b. an axial bore extending between the surfaces;
    c. the bore including a counterbore extending from a back surface toward a face surface;
    d. the bore includes a shoulder, the shoulder being an annular drive section circumscribing the bore and adapted to engage a push rod in force transmitting relationship;
    e. the face surface including a nose section surrounding said bore and an annular recess section surrounding the nose section;
    f. a perimeteral surface extending axially from the face to the back surface;
    g. the perimetral and face surfaces together defining a perimetral lip around the recess section, the lip being of tapering thickness tapering from its thickest part at a location nearest the back surface forwardly to a thin termination at a juncture of the face and perimeteral surfaces; and
    h. an annular disc disposed in the recess section and engageable when in use with the lip, in outward force transmitting relationship to press the lip against an internal wall of a surrounding dispenser tube.

7. The piston of claim 6 wherein the lip flares outwardly in a direction from said location toward said juncture.

8. The piston of claim 6 wherein the piston is a plastic piston.

9. The piston of claim 8 wherein the plastic is Delrin.

10. The piston of claim 6, wherein said annular disc includes an outwardly tapering thickness such that said disc is thickest at its perimeter.

11. The piston of claim 6, wherein said annular disc is made from a metal.

12. The piston of claim 6, wherein said annular disc is made from a polymer.

13. The piston of claim 6 further including an elastic member placed between said annular disc and said body.

14. For use in a viscous material dispenser, a piston assembly comprising;
    a. a main body having an axial bore for receipt of a push rod;
    b. the body having a face including an annular recess and a lip surrounding the recess, said recess being tapered and spaced axially from the face of the body and increasing in depth as the recess extends to a perimeter of said body;
    c. a camming washer disposed at least in the part in the recess having a relatively small height compared to its diameter, the washer including a perimetral camming surface engageable with the lip;
    d. the body and washer being connected together for limited relative axial movement when the piston assembly is advanced against material in a cartridge to dispense such material, such relative movement being effective to cause the camming surface to force the lip outwardly into tight engagement with a wall of such cartridge wherein said camming washer includes an outwardly tapering thickness such that said washer is thickest at its perimeter; and e. an elastic member placed between said camming washer and said body.

15. The piston of claim 14, wherein said lip is continuous.

16. In combination, the piston assembly of claim 14 and a motor drive push rod.

17. The piston assembly of claim 14, wherein said camming washer is made from metal.

18. The piston assembly of claim 14, wherein said camming washer is made from a polymer.

19. A viscous material dispenser having a piston assembly comprising:
- a body having a tapered recess for receiving a camming disc, the tapered recess being spaced axially from a face of the body and increasing in depth as the recess extends to a perimeter of said body;
- first and second annular tapered surfaces located on said camming disc, said first annular tapered surface originating at a first location spaced axially from a central axis of said camming disc, increasing the cross-sectional thickness of the first annular tapered surface laterally as it extends to the first annular tapered surface's thickest point at a perimeter of the camming disc, said second annular tapered surface located about said perimeter of said camming disc; and a smaller diameter of the second annular tapered surface being in contact with the recess during assembly and tapering to a relatively larger diameter extending away from said recess; and
- a plurality of elastic members positioned between said recess and said camming disc such that compression of said elastic members results in a camming of said second annular tapered surface against an annular lip of said body resulting in an outward force transmitting relationship with said annular lip and an internal wall of a surrounding dispenser tube.

20. The viscous material dispenser having a piston assembly of claim 19 further comprising first and second gaps formed radially inward and radially outward, respectively from each elastic member between the body and camming disc such that compression of the elastic member by the camming disc causes diametrically outward movement of said lip.

* * * * *